Feb. 11, 1969  J. W. NELSON ETAL  3,427,428

APPARATUS AND METHOD FOR WELDING METAL PIPES AND THE LIKE

Filed Sept. 14, 1965

INVENTORS
JEROME W. NELSON
PERRY J. RIEPPEL

BY Donald F. Wohlers
ATTORNEY

United States Patent Office 3,427,428
Patented Feb. 11, 1969

3,427,428
APPARATUS AND METHOD FOR WELDING
METAL PIPES AND THE LIKE
Jerome W. Nelson, Columbus, and Perry J. Rieppel,
Worthington, Ohio, assignors, by mesne assignments, to Esso Research and Engineering Company, Elizabeth, N.J., a corporation of Delaware
Filed Sept. 14, 1965, Ser. No. 487,168
U.S. Cl. 219—125         2 Claims
Int. Cl. B23k 9/32

ABSTRACT OF THE DISCLOSURE

A welding apparatus is provided for aligning and welding individual pipe sections together in end to end relationship. The apparatus includes a self-propelled vehicle having a rigid elongated channel pipe alignment member extending along the longitudinal axis of the vehicle and attached thereto. The alignment member has an upwardly disposed U-shaped groove with a rear portion of the member for engagement with the end of a first pipe section and a forward portion for engagement with the end of a second pipe section. The alignment member includes individually controllable clamping means attached to opposite ends thereof and including further replaceable cradle insert means. A hydraulic actuator is connected to the clamping means for accurate alignment of the adjacent ends of the first and second pipe sections to be welded.

---

The present invention relates to an improved process and apparatus for welding metal pipes and the like. It has particular application to making butt welds in steel pipelines. It is especially suited for welding pipelines of relatively small to medium diameters but can be extended to welding of larger lines if desired.

It has been proposed in the prior art to weld tubular metal sections together in butt joints by gas shielded, consumable thin wire electrode welding. This gas shielded electric arc welding system, and especially the narrow gap thin wire system, is particularly applicable to the present invention. However, it will be understood that other welding procedures also may be used in some cases, particularly with some aspects of the invention.

A highly satisfactory technique for welding butt joints in tubular structures, such as pipelines, is that described generally in U.S. Patent No. 3,084,246 to Rieppel et al. As described in said patent, joints of pipe that are to be welded end to end in a butt type joint are first brought together in juxtaposed position for welding. The parts are held in place or adjusted into place and a welding gap of approximate or exact width is formed between the abutting end structures. The gap may be formed, for example, by precisely spacing the pipe ends or by cutting a kerf of desired gap width with an abrasive wheel, a milling type cutter, or the equivalent.

For cutting, the original spacing is less than the final desired gap width but it may be only slightly less. In any case the final gap is of closely controlled dimensions so as to obtain a highly uniform and parallel spacing to receive the ultimate weldment. This gap formation is then followed by a consumable electrode gas shielded arc-welding procedure, by means of which a thin wire electrode is rapidly fed into the gap at a highly uniform rate and is fused in place. The main weld preferably is completed in a single pass in pipes of moderate wall thickness, or at most in one or two additional passes for thicker walled pipe and tubing.

One limitation of the system just described, as it has been practiced in the past, is that it depends usually on an internal line-up clamp for holding the pipe lengths while they are being welded. It has been found in practice to be extremely difficult to hold long lengths of pipe, by means of an internal clamp only, with sufficient force and accuracy to maintain a uniform welding gap. Such a gap is essential to perfect welding. One object of the present invention is to make possible a better holding and thus facilitate good welding at high speed.

It is desirable, also, for efficient pipeline construction, to be able to string the pipe together expeditiously and then weld it rapidly. This cannot be done as well with prior art equipment and procedures as is desirable. Internal clamps, for example, require careful placement and precise pipe alignment for the type of welding described above. The present invention has as another object the facilitation of efficient pipeline construction by reducing the time required for placing the pipes in their required end-to-end and axial alignment relationship.

Another very serious difficulty encountered in operations of this kind in the past involves the continued effective holding of the parts in proper relationship while the weld is actually being made. Aside from the mechanical difficulties of obtaining and holding original alignment, the stresses which build up during welding due, for example, to differential heating and cooling make it very difficult to hold the parts in alignment with the accuracy required. A specific object of this invention is to accomplish such holding effectively.

It has been proposed in the past also, as suggested in the aforesaid patent in an alternative procedure, to tack weld the assembled parts together and to complete the procedure by filling in the weld later, cutting out tack weld elements where necessary as the finish weld is accomplished. Tack welds can be made, of course, to hold pipe sections together and to prevent distortion of the pipeline while a principal weld is being formed. With very large pipes and other structures tack welding is advantageous. Tack welding is less advantageous, however, with small diameter pipelines than with larger ones. It consumes considerable time. However, where it is needed, the present invention also contemplates the use of tack welds where they may be used to facilitate progress in pipeline construction. In many situations they are not needed at all. The extra operation of tack welding is preferably avoided as a rule and the present invention usually will make it unnecessary, at least in small and medium diameter pipelines.

According to the present invention, the girth joint welding of tubular structures such as pipelines of small to medium size, e.g. up to about sixteen inches diameter, is accomplished by first bringing the pipe sections directly to the approximate location, then bringing them together by rapid adjustment and firm control into a more precise relation in which they are to be finally welded, and rigidly holding them there against all misalignment forces while a very accurate form of welding is accomplished. The welding operation is performed at high speed. The equipment for this purpose includes means for firm and adequate assembly, alignment and holding of the parts and automatic precision-controlled welding means for forming a substantial girth weld at a single operation.

The present invention in its method aspects involves, more particularly, a combination of procedures as follows:

First joints of pipe are picked up quickly from a supply along the route. These are brought one by one into appropriate abutting end-to-end relationship. They are adjusted to accurate position and then held firmly in such position, at least while a single pass weldment of substantial strength is formed. This holding and alignment involves the use of strong and rigid holding mechanism which, per se, is also an important aspect of this invention. The mechanical equipment includes a rigid framework or strong-back system equipped with means for firmly grasping and holding the pipe externally so as totally to prevent misalignment. With small and medium diameter pipe, an internal clamp or aligning device normally will not be needed with this improved system. The pipe is held externally with sufficient force and accuracy to maintain alignment. An internal clamp may be used, however, with large diameter pipes if deemed desirable. In some cases it may not be practicable to hold large pipe joints with required precision by external means only.

The weld preferably is substantially completed in a single pass, with pipes of ordinary thickness, or at most in two or three passes for thicker walled pipe. This is accomplished by an automatic welding procedure which involves (a) forming or preparing the narrow welding gap of highly uniform width all around the pipe to receive the new weld; (b) feeding a wire electrode into the gap at an accurately controlled rate; and (c) forming the new weld automatically by progressive welding around the pipe. If desired, a finish or surface weld may be performed later by manual or mechanical means as desired. During the main welding operation, the present system makes it possible to eliminate much of the delays previously encountered in systems of semiautomatic type. These delays are usually due to inadequate control of the alignment and spacing at the joint.

This procedure has a particular advantage in rapid welding and in laying of pipelines in the field. It makes it possible for the contractor to get maximum economic utilization of his expensive welding equipment and of the skilled labor usually required in pipeline construction.

In general, the specific operations of the new method will proceed as follows:

(1) A new length of pipe is brought to the rigid frame or strong-back apparatus which can then take control of it.

(2) The end of the existing pipeline and the next length of pipe to be attached thereto are both supported by accurately fitting holders on a rigid frame. They are grasped over a substantial distance on each side of the girth joint. The adjoining sections of pipe are thus brought into and held in substantially perfect alignment. This can be done very quickly. The supporting structure involves a solid and rigid base. It includes powerful external clamps which fit the pipe neatly, hold it with firmness and precision and thus eliminate difficulties in maintaining alignment. Since curved sections of pipe must be handled sometimes, the apparatus must be capable of lifting the joints to adequate height to clear the ground. An important point in alignment is that the adjoining end surfaces of the pipe, which have been finished previously in flat planes preferably, are brought face to face in parallel relationship. They must also be held in substantially perfect parallel relationship in spite of the weight of the pipe and any stresses, including thermal, that may be imposed thereon. Under these circumstances and assuming proper welding equipment and control, a high precision weldment can be made.

(3) The abutting pipe ends are then either spaced apart mechanically to form a narrow gap of precise proportions, or alternatively such a gap is cut. If tack weldment has been applied, this will be cut out ahead of the welding operation to provide the desired narrow gap around the whole periphery. This gap forming operation is followed closely behind by the welding operation.

(4) The joint preferably is welded, or at least a strong and substantial weldment is made, in a single pass operation. Automatic equipment is used and preferably is operated from an annular guide means. This may be a detachable track which may be attached directly to the surface of the pipeline itself. Alternatively, it may be an annular guide built into the strong-back system. Other means also or alternatively may be provided to insure that the welding equipment follows the desired welding path and that it forms the joint precisely in the proper position with a uniform weldment. Multiple pass welds may be required in thick walled pipe, as previously noted. Single pass welding is preferred where it is adequate.

Attempts have been made in the past to weld pipelines by flash welding, by oxyacetylene pressure welding, and by induction pressure welding techniques. In the latter case welding is accomplished by forcing the heated pipe ends together with sufficient force to upset the metal as the weld is formed. Such equipment and processes, while technically feasible, are generally not economical because of the very massive and expensive equipment needed. By contrast, the system of the present invention, while fairly heavy, is much simpler. It makes it possible to construct pipelines at substantially reduced costs, with much less massive and less expensive equipment.

The invention will be more fully understood by reference to the attached drawings, wherein.

Figure 1:
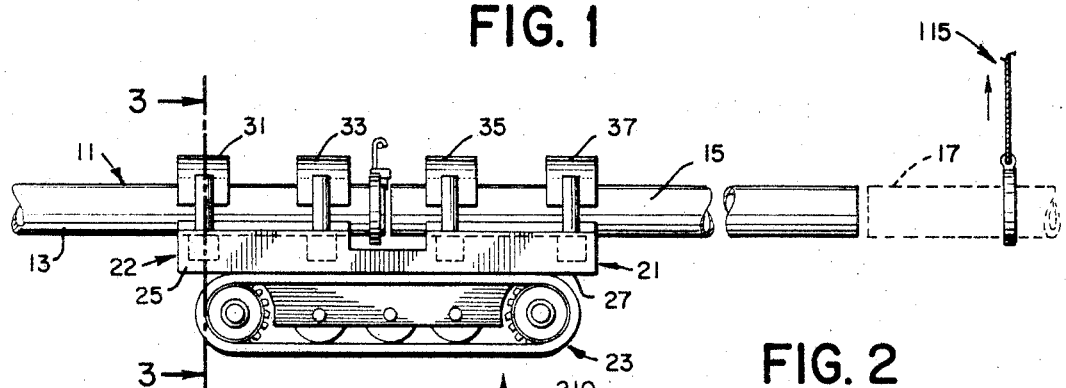
FIG. 1 is a small scale elevational view illustrating basic equipment diagrammatically and showing some procedural aspects of the invention.
Figure 2:
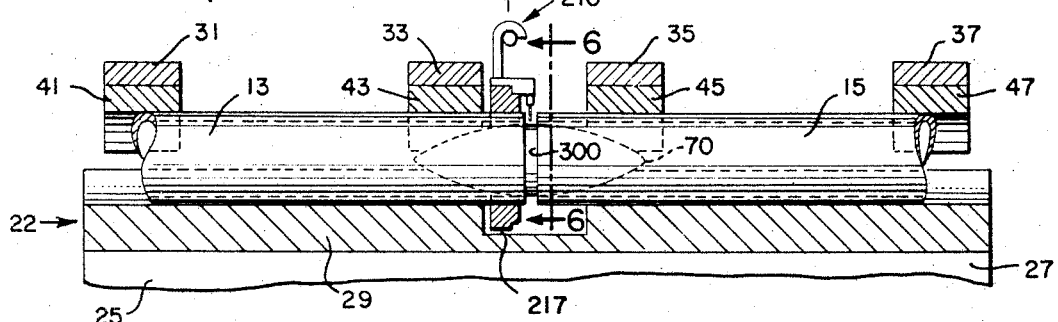
FIG. 2 is an enlarged longitudinal vertical sectional view with certain parts omitted, of the rigid pipe holding apparatus of FIG. 2, showing certain aspects of a method of holding and welding which are inherent in the present invention.

Referring now to FIG. 1, a pipeline 11 of small to medium diameter is shown, consisting of the fixed part 13 of the line already installed, although not yet buried. The part 13 is substantially finished so far as the main welding operation is concerned, although it may still require other finishing operations such as wrapping, coating, cleaning, etc. A new section 15, ready to be attached, is indicated as being added and is in approximate position for welding or for final preparation for welding, as seen in FIG. 2. In dotted lines, FIG. 1, a future section to be added later is indicated at 17. It may be picked up by a suitable crane or other lifting device, indicated diagrammatically at 115.

A sturdy rigid framework involving a strong-back clamping apparatus 21 is provided which is capable of firmly and accurately holding the new section 15 in precise alignment with the installed line 13. Strong-back 21 comprises a heavy base framework 22 which preferably is supported on a self-driven vehicle, shown here as a track laying structure 23. The latter is preferably a conventional heavy tractor or self-propelled track laying vehicle of a type well known in construction machinery. The strong rigid base frame 22 consists of a rear portion 25 and a forward portion 27, each of which supports part of a cradle structure. The latter is designed to support each of the adjoining sections of pipe 13, 15 over a substantial length. This length may vary with pipes of different sizes but should be at least 6 pipe diameters or more in most cases. The bed or cradle element 29 has a concave upper surface adapted to fit quite accurately the lower part, approximately half, of the circumference of the pipe sections 13 and 15 so that strong forces may be applied to the pipes at or near their juncture without distorting or damaging the pipe portions which are held. External clamping devices are designed to be complementary to the cradles for applying clamping force to the upper parts of the pipes. These are indicated at 31, 33, 35 and 37, respectively. The clamping devices may assume several different forms and, if desired, sections of the respective pairs of upper and lower clamping elements may be formed into separate units.

The clamping units collectively are sufficiently powerful that they can maintain quite complete and accurate control over both the installed section 13 and the new section 15 of the pipeline and maintain an accurate alignment, notwithstanding strong forces such as the weight of pipe section 15 which is being supported in cantilever fashion.

Figure 3:
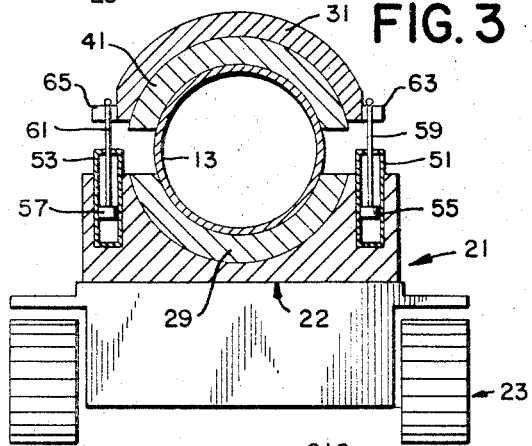
FIG. 3 is a transverse vertical sectional view taken substantially along the line 3—3 of FIGS. 1 and 2, being considerably enlarged over FIG. 1.

Referring to FIG. 3, the strong-back apparatus indicated in section includes elements 22, 29, and 31. The strong-back holding apparatus forms nearly a complete encirclement of the pipe and is rigid enough to maintain exact alignment around the exterior of the joint. The apparatus also includes the replaceable cradle member 29 which is adapted to fit the pipe externally with a good degree of accuracy, as are the complementary clamping shoes. The cradle 29 can be replaced by another unit of different internal size when a different diameter pipe is being handled.

Clamping is obtained by applying pressure to elements 31, 33, 35 and 37 and through them to shoes 41, 43, 45 and 47 carried respectively by those elements. The means by which this pressure is applied are not particularly critical. As shown here they comprise hydraulic cylinders 51 and 53 equipped with movable pistons 55 and 57, respectively. The latter are connected by means of strong links, or piston stems and links, 59 and 61, to the ears 63 and 65 of member 31. Similar pistons and links operate the elements 33, 35, and 37 respectively. By applying simple tension to the pistons 55, 57 and the connecting links 59, 61, etc., through the hydraulic system 51, 53, etc., effective clamping pressure may be brought to bear on the pipe to any reasonable degree required. The apparatus so far described maintains generally good exterior alignment.

In addition to the external clamping structure shown in FIG. 3, it may be desirable in some cases, with larger pipe, to employ an internal line-up clamp. The reason for this is that large pipe may be slightly elliptical in cross-section and an internal clamp can be useful to round it out and produce good girth alignment. The internal clamp will supplement or assist the external clamp in maintaining alignment. In unusual cases internal clamps may thus be used to maintain good alignment and to produce a smooth interior surface at the welded joint, which is important in a pipeline. When used, these internal clamps are of conventional type, usually operated by hydraulic, pneumatic, or mechanical means. Such a clamp is shown in dotted lines at 70, FIG. 2, and in FIG. 4 as a modification. It fits inside the girth joint and is expanded so as to draw it up tight and secure. After the joint is fastened by welding enough to prevent distortion, the internal clamp can be contracted and pulled ahead to the next joint, i.e., the junction of joints 15 and 17, and made ready for the next welding operation.

Figure 4:
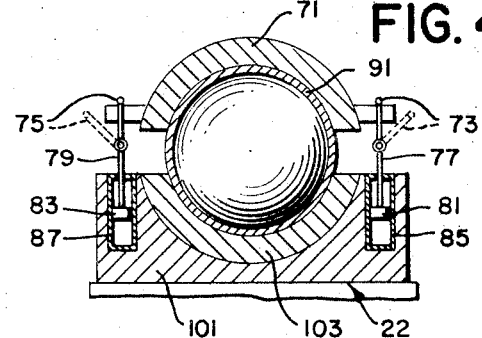
FIG. 4 is a transverse vertical sectional view showing a modified mechanism which may be used alternatively for that of FIG. 3.

In FIG. 4, a somewhat different arrangement is shown wherein a nearly half-circular upper shoe 71 is operated in the same general manner as in FIG. 3 through detachable links 73 and 75. These links are pivotably secured to the piston rods 77, 79 of hydraulic pistons 81 and 83. The latter are operated in hydraulic cylinders 85, 87 through control means not shown, to bring the necessary clamping pressure against the pipe which is indicated in this figure at 91. The main strong-back support 101, FIG. 4, is fitted with a lower saddle or cradle form 103 which is complementary in internal size and shape to the pipe. For different size pipes a different cradle or saddle 103 of course will be substituted, as previously suggested. The same is true of the upper clamp shoe 71. The latter is shown in this embodiment without an outer support. It will be understood that the strong-back structure 101, etc., of FIG. 4 is supported on an appropriate base such as a tracked vehicle, as is the case with the apparatus of FIG. 3.

In some cases is may be desirable to lightly weld or firmly tack the weld so that the apparatus may be moved ahead to the next joint, leaving a main welding operation to be carried out later. Hand operations may be used in some cases to carry out the tack welding or part of it, if desired, but it is desirable to do the tacking with an automatic or semiautomatic welder. This makes a stronger weld, more free of distortion, and it is faster. Such a weld is indicated generally at 200, FIG. 5. The tack weld 211 may consist either of intermittent weldments which bridge the gap 100 between the pipe sections, or it may be in the form of a continuous root weld. Preferably this is in the form of a small continuous bead. For making such a continuous welding bead the apparatus described in U.S. Patents 3,084,244 or 3,084,246 is satisfactory, provided that a uniform narrow gap can be established and maintained between the pipe ends during the tacking or bead forming operation. In other cases, as where the pipe ends are somewhat rough or uneven, the two sections of pipe will be brought about as close together as possible or convenient. If desired, tack welding may then be done manually. The welding gap, in this case, will later be cut out to the desired width by means known in the art and such as that described in the patents just mentioned. The tacks will be cut out too. The tack weldment in such a case, if discontinuous, should be of sufficient continuity, i.e., close spacing and adequate strength of separate weld elements, to maintain the joint against subsequent distortion.

It is quite essential that the adjacent ends of pipe lengths that are to be joined by a butt joint girth weld be held and rigidly maintained in proper alignment while either a complete weld or a preliminary partial or tack weld is formed. To prepare a clean accurate gap, good alignment must be maintained also. The apparatus therefore must have the necessary aligning means. To supplement the latter, gap gaging elements may be used, along with any necessary means for adjusting the clamping shoes 41, 43, etc., or 71, FIG. 4, etc. It is also essential that the partial or tack weld, if one is used, be performed in such a way that the joint per se is not distorted during such operation. The weldment must be strong enough to hold it in proper form against any possible later distortion due, for example, to heating and warping.

It will be understood that the strong-back member 21 must extend along the pipe lengths far enough to support the pipe sections with adequate rigidity to prevent joint distortion. This must be done without crushing them by too much clamping pressure. Since pipe sections or joints are often 40 to 60 feet long, and may be 80 feet long (as is common in "double jointing"), it will be appreciated that the member 21 must be a very strong and rigid structure. At the same time, for portability, the apparatus must not be unduly heavy. Member 21 may be or comprise a heavy casting or, preferably, it may comprise a lighter weight body of strong metal which is suitably reinforced or trussed or braced to give it ample support to prevent joint distortion under all foreseeable conditions. It should preferably engage a length of four to ten feet of pipe on each side of the juncture in order to firmly support a relatively heavy projecting pipe 40 feet or more in length. As a good general rule, it should engage at least six to ten or more pipe diameters in length on each side of the weld.

Commonly, the newly added pipe length 15 may also be given some additional support, as by a tractor crane or the like (not shown) which lifts the pipe by a chain, cable or sling as indicated generally at 115, FIG. 1. The end of the installed pipe may be similarly supported, if desired. In cases where the support is ample and very steady, such a support 115 may be adequate by itself and the strong-back 21 need not take as much of the cantilevered load of the long, newly extended pipe section. Under field conditions, however, the ground which supports tractor cranes often will not be sufficiently firm or level to depend on tractor support alone. In some circumstances the extra tractor suporting the new length of pipe is really of little or no help in keeping the joint accurately aligned for good welding.

When it is realized that the width of the gap between pipe ends must be kept relatively very uniform around the entire periphery, i.e., within a few thousandths of an inch, for perfect automatic welding, it will be understood why the outer end of the pipe cannot be allowed to sag perceptibly. A 6-inch pipe 40 feet long, for example, would open the gap by about 0.010″ if the remote pipe end were allowed to drop as little as ¼ of an inch. A variation of as much as 0.010″ in gap width is often too great to be tolerated. This indicates the close tolerance that must be maintained at the joint and emphasizes the need for rigidity in the strong-back.

The support, including cradle elements 29 (FIG. 3) or 103 (FIG. 4) and/or the base element 22 or other structures in which the cradles are supported, on the strong-back and in the clamps, is desirably designed to tilt the cantilevered pipe length 15 slightly upward, just about enough to compensate for the amount of frame yielding or downward deflection that the average cantilevered pipe joint will cause. That is, in effect, the support mechanism will be designed to lie straight, and hold the pipe in line, when under load. If necessary, also, the cradle members such as 29 can be shimmed up at appropriate points to give the desired axial alignment of the new section with the installed pipeline section. The important point is that the support must maintain proper alignment at the joint.

Figure 5:
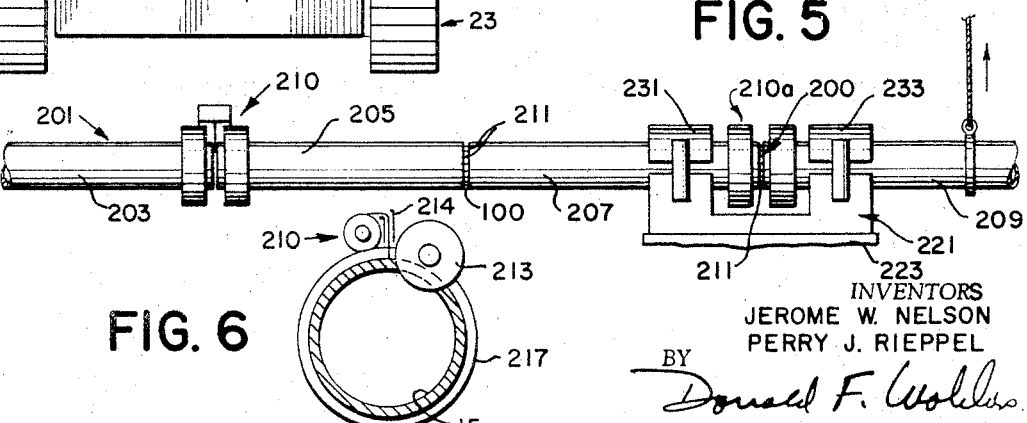
FIG. 5 is a small scale view, partly diagrammatic, of a multi-joint pipeline illustrating certain sequences in a modified series of welding operations.
Figure 6:
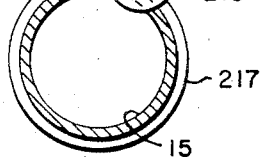
FIG. 6 is a transverse view partly in vertical section taken approximately along the line 6—6 of FIG. 2, being somewhat enlarged.

Referring further to FIGS. 5 and 6, a pipeline 201 is shown composed of an already installed joint or length 203, and the new lengths 205, 207 and 209. The joint or length 203 is the last part of the line that has been finish welded. New joint 205 is shown undergoing a welding process. Joint 100 has been tack welded at 211. A welder unit of the general type described in U.S. Patent No. 3,084,246, or that described in U.S. Patent No. 3,084,244, is indicated diagrammatically at 210. See also FIG. 6. The cutter-welder unit is arranged, firstly, to cut out the tack welds, where such are used, and to cut a uniform welding gap and, secondly, to supply a fine wire electrode to the gap at an appropriate rate and to form a substantially continuous arc in the gap so that either a single pass or a multi-pass weld, as required, is formed to complete the joint.

The cutter for the gap, shown at 213, which precedes the welding head shown diagrammatically only at 214, FIG. 6, is designed to leave the joint properly prepared with a narrow gap, ready for rapid automatic welding which follows immediately. Desirably, the welder follows within a few degrees of arc behind the cutting operation. This angle should preferably be below 30 degrees. Where possible, it should be 10 degrees or less.

The welder 210 is mounted and operated to travel about the girth joint in an orbit. It is supported on an annular frame or track 217, see also FIG. 2, which may comprise a guide track element in the form of either a continuous or a split ring, both of which are known in the art. See the patents mentioned above, for example.

At the right in FIG. 5 is shown a strong-back support 221, generally similar to that of FIG. 1, which is suitably mounted on a base 223. The latter may be the frame of a track laying tractor or some other mobile vehicle of suitable type, preferably a unit like that shown in FIG. 1. Clamping units 231 and 233 are essentially the same as or perform the same functions as elements 31, 33, 35, etc., FIG. 1. Each of them is preferably individually operable and adjustable. Thickness gages, either manual or mechanical, may be used between the pipe ends, e.g., at 300, FIG. 2, to adjust the gap for welding.

As previously explained, the initial weld, preferably a full weld, but it may be a tack weld if desired, is carried out with the pipe ends carefully aligned in the relationship desired for the final weld. When a partial or tack weld is made and the strong-back apparatus is to move ahead, the weld must be strong enough to support the mechanical load on the pipeline, including the weight of the line itself, that of any equipment supported thereby, and also to withstand any other forces due to the heat of subsequent welding operations. At the same time, the partial weld must be made under conditions that do not themselves cause any substantial distortion of the joint, due, e.g., to excessive local heating. The welder unit, including its guide track and associated elements, is preferably mounted on the pipeline and it may, if desired, be designed to move along the pipe from joint to joint without other support. Other equipment such as pipe wrapping machines, coating devices, etc., may also be carried by the pipe, farther back, and coating, wrapping, etc., may be applied by other equipment or by field conditions.

The weld, particularly the main welding pass, should follow the cutting or joint preparation operation as closely as practicable to minimize warpage or distortion which might otherwise occur due to differential heating and cooling along the new weld. This is an important aspect of the present invention. Preferably, where tack welding has been performed and the equipment moved ahead, not more than about 10% or so of the circumference is cut loose and unwelded at any given time and it is desirable to hold this down to 5% or less where possible.

While the drawings show use only of a single welder unit in FIGS. 1 and 2, and two in FIG. 5., i.e., at 210 and 210a, it will be understood that multiple units may be used where necessary so that weld completion may not hold up the construction. But even with a single welder unit, the system of the present invention greatly facilitates the pipeline construction as a whole. Most joints can be finished so rapidly with a single weld unit that welding bottlenecks can largely be avoided in line construction.

If desired, welding and cutting units, of the general type described in the aforesaid patents, may be leap-frogged along the line when other operations tend to get ahead of the welding. Particularly when the welding units are of the split ring or open ring type, they can be lifted on and off the line at any point. Full ring units which are adapted to ride along the pipe from joint to joint, may also be used. These have certain advantages in that no lifting crane may be required to shift them. They may be self-propelled if desired. They do require, however, that support cribbing under the line ahead of the welder be omitted or removed. This may be a disadvantage under some circumstances.

It will be obvious to those skilled in the art that various other modifications may be made without departing from the purpose and spirit of the invention. It is intended by the claims which follow to cover such modifications as are equivalent and such as would suggest themselves to those skilled in the art.

What is claimed is:

1. Apparatus for aligning individual pipe sections for welding comprising a self-propelled vehicle, a rigid elongated channel pipe alignment member extending along the longitudinal axis of said vehicle and attached thereto, said alignment member having an upwardly disposed U-shaped groove, said alignment member having a rear portion for engagement with the end of a first pipe section and a forward portion for engagement with the end of a second pipe section to be welded to the end of said first pipe section, replaceable cradle insert means within said groove having an inside surface conforming to the outside diameter of the pipe sections to be welded individually controllable clamping means attached to opposite ends of said alignment member, said clamping means each including further replaceable cradle insert means for accurately engaging the outside diameter of the pipe sections, and hydraulic actuator means connected to said clamping means whereby upon actuation of said actuator means the adjacent ends of the first and second pipe sections to be welded are each clamped to said pipe alignment member and therefore accurately aligned with each other.

2. The method of aligning and welding individual pipe sections into a pipeline comprising the steps of supporting one end of a first pipe section upon a rear portion of a self-driven vehicle disposed directly under the pipe section, hydraulically clamping the end of the first pipe section to a rear portion of an elongated channel alignment member extending substantially the entire length of said vehicle, positioning one end of a second pipe section upon a forward portion of said elongated channel alignment member into substantially end abutting relationship with said first pipe section, hydraulically clamping the end of said second pipe section to a forward portion of said elongated channel alignment member whereby the second pipe section is cantilever supported from said vehicle and assumes the alignment of the elongated channel alignment member to which the end of the first pipe section is also clamped, and welding the adjacent ends of the abutted pipe sections.

References Cited

UNITED STATES PATENTS

| | | | |
|---|---|---|---|
| 2,783,359 | 2/1957 | Gunther | 219—61 |
| 3,009,049 | 11/1961 | Stanley | 219—60 |
| 3,035,147 | 5/1962 | Latter | 219—60.1 |
| 3,035,156 | 5/1962 | Staley | 219—125 |
| 3,042,787 | 7/1962 | Kotecki | 219—60.1 |
| 3,084,244 | 4/1963 | Rieppel et al. | 219—60.1 |
| 3,084,246 | 4/1963 | Rieppel et al. | 219—60.1 |
| 3,102,187 | 8/1963 | Coscia | 219—60.1 |
| 3,116,865 | 1/1964 | Lehnert et al. | 219—60 |
| 3,284,883 | 11/1966 | Haverfield et al. | 219—60 |

RICHARD M. WOOD, *Primary Examiner.*

W. DEXTER BROOKS, *Assistant Examiner.*

U.S. Cl. X.R.

219—60